US008438227B2

(12) United States Patent
Mo et al.

(10) Patent No.: US 8,438,227 B2
(45) Date of Patent: May 7, 2013

(54) INSTANT MESSAGING USING BROWSER

(75) Inventors: Jianxiang Mo, Hangzhou (CN); Dayi Jiang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 93 days.

(21) Appl. No.: 11/756,871

(22) Filed: Jun. 1, 2007

(65) Prior Publication Data
US 2007/0282963 A1 Dec. 6, 2007

(30) Foreign Application Priority Data

Jun. 2, 2006 (CN) .......................... 2006 1 0083350

(51) Int. Cl.
*G06F 15/16* (2006.01)
(52) U.S. Cl.
USPC ............ 709/206; 709/204; 709/205; 709/207
(58) Field of Classification Search ................... 709/205, 709/206, 207, 217
See application file for complete search history.

(56) References Cited

U.S. PATENT DOCUMENTS

| | | | |
|---|---|---|---|
| 6,020,884 | A | 2/2000 | MacNaughton et al. |
| 7,032,023 | B1 | 4/2006 | Barrett et al. |
| 7,127,685 | B2 | 10/2006 | Canfield et al. |
| 7,389,349 | B2 * | 6/2008 | Kouznetsov et al. ......... 709/224 |
| 2004/0128356 | A1 | 7/2004 | Bernstein et al. |
| 2004/0152450 | A1 * | 8/2004 | Kouznetsov et al. ...... 455/412.1 |
| 2005/0021645 | A1 * | 1/2005 | Kulkarni et al. .............. 709/206 |
| 2005/0044144 | A1 * | 2/2005 | Malik et al. ................... 709/205 |
| 2005/0055443 | A1 * | 3/2005 | Tosey et al. ................... 709/225 |
| 2006/0059239 | A1 * | 3/2006 | Kouznetsov et al. ......... 709/206 |
| 2007/0253340 | A1 * | 11/2007 | Varney et al. ................. 370/252 |
| 2008/0132252 | A1 * | 6/2008 | Altman et al. ................ 455/457 |

FOREIGN PATENT DOCUMENTS

| | | |
|---|---|---|
| CN | 1653829 A | 8/2005 |
| JP | 11272578 | 10/1999 |
| JP | 2005516294 | 6/2005 |
| JP | 2006221450 | 8/2006 |
| WO | WO0137139 A1 | 5/2001 |

OTHER PUBLICATIONS

Mova et al. ("MSN Messenger Service 1.0 Protocol", Aug. 1999, http://www.hypothetic.org/docs/msn/ietf_draft.txt, 1-20).*

The Chinese Office Action mailed Dec. 5, 2008 for Chinese patent application No. 2006100833504, a counterpart foreign application of U.S. Appl. No. 11/756,871, 6 pages.

PCT Search Report and Written Opinion for PCT application No. PCT/US07/70222 mailed on Apr. 22, 2008, pp. 11.

(Continued)

*Primary Examiner* — Karen Tang
(74) *Attorney, Agent, or Firm* — Lee & Hayes, PLLC

(57) ABSTRACT

Methods and systems for instant messaging using a browser to eliminate the requirement of installation of instant messaging software at the user end is described. When a source user sends an instant message to a target user, the source server (the server which the source user is logged in) searches the information of the target server (the server which the target user is currently logged in) with the help of an instant messaging status server, and sends the instant message to the target server according to the search result. The target server then relays the instant message to the target user. The target server may also send a reply message to the source server, which in turn transmits the reply message to the source user. Preferably, at least one of users uses a browser and not an instant messaging client software.

19 Claims, 8 Drawing Sheets

OTHER PUBLICATIONS

The European Office Action mailed May 21, 2012 for European patent application No. 07798017.5, a counterpart foreign application of U.S. Appl. No. 11/756,871, 8 pages.

Translated Japanese Office Action mailed Jun. 15, 2012 for Japanese patent application No. 2009-513473, a counterpart foreign application of U.S. Appl. No. 11/756,871, 5 pages.

* cited by examiner

INSTANT MESSAGING USING BROWSER

CROSS-REFERENCE TO RELATED APPLICATIONS

This application claims benefit of an earlier filing date of Chinese patent application, Application No. 200610083350.4, filed Jun. 2, 2006, entitled "A SYSTEM AND METHOD FOR INSTANT MESSAGING USING A BROWSER".

BACKGROUND

This disclosure relates to instant messaging technology, particularly the method and the system of implementing instant messaging through a browser.

Instant messaging (IM) is a technology that allows one to identify other online users and exchange messages with them. IM enables users to locate and establish an independent chat session with another user. Once connected, users can exchange comments in real time and share files.

FIG. 1 shows a common instant message system. The instant messaging is achieved through communication between an instant messaging server 110 and instant messaging user terminals 120 and 130. The instant messaging user terminals 120 and 130 are usually installed with client software designed for instant messaging. Such instant messaging client software typically has a receiving module (e.g., 122 and 132) and a sending module (e.g., 124 and 134).

The current instant messaging software such as TradeManager, QQ and MSN, for example, all require software installation at the user end (e.g., instant messaging user terminals 120 and 130). This is not always convenient. For example, in case one needs online chat in an internet bar, proper instant messaging software must be installed on a public computer or terminal first, making the process troublesome and lacking privacy. In addition, if there is firewall setup in the computer, one may not be allowed for online chatting.

Furthermore, current instant messaging schemes are based on desktop systems (graphical operating systems like Windows). Software download is usually slow due to file size and connection speed. Even after downloading, software installation may still pose a challenge to many users. Furthermore, modern software requires frequent software update which may not be easy to do. It is common to require the user to update the software manually or set up background automatic update. If the user does not update the software, the user is left with an old version of the instant messaging client software which may be less functional, less secure or even dysfunctional.

SUMMARY

The disclosed instant messaging system and method use a user server (such as a Web chat server) of a browser user to transmit instant messages between instant messaging users. An instant messaging user may be a browser user or an instant messaging client software user. The system and method allow instant messaging between a browser user and an instant messaging client software user, as well as instant messaging between two browser users, without installation of instant messaging software.

The use of a browser to implement instant messaging eliminates, at least at the browser user end, the requirement of specific instant messaging software for instant messaging in the existing technologies.

One aspect of the disclosure is a method of using browser to implement instant messaging with the following procedures:

(1) Source user sends an instant message to target user. At least one of the source user and the target user is a browser user using a browser.

(2) The source server (the server of the source user) searches the information of the target server (the server of the target user) and sends the instant message to the target server which the target user currently logs in according to the search result.

(3) The target server then transmits the instant message to the target user. If the target user replies, the target server sends the reply message of target user to the source server which forwards the message to the source user.

Before the browser user begins instant messaging, the browser user may be required to log into a Web chat server. The logon of the browser user to the Web chat server may follow an exemplary procedure described below:

(1) Browser user sends the login request to a dispatch server.

(2) Dispatch server assigns a Web chat server to the browser user based on the information in the login request and redirects this request to the assigned Web chat server;

(3) The Web chat server validates the identity of the browser user and allows login of the browser user after successful validation. After the dispatch server allocates the Web chat server to the browser user, that browser user may maintain communication connection with the Web chat server during the whole process of messaging.

In one embodiment, when the status of an instant messaging user changes, the user server which a user logs into sends a current status message to an instant messaging status server. The instant messaging status server then transmits this status message to the user server of another user.

One aspect of the present disclosure is an instant messaging system includes an instant messaging status server, user servers and user equipment. The instant messaging status server is used for recording the information of the user servers which the users log in and the user status messages. Multiple user servers, which separately connect to the instant messaging status server and the respective user equipment, are used to transmit the instant messages among the users according to the information of the user servers and the user status messages recorded in the instant messaging status server. The user servers may include a Web chat server. Multiple sets of user equipment, which connect to user servers, are used to send and receive instant messages.

The system may also include a dispatch server. The dispatch server allocates a user server (such as a Web chat server) for the user equipment which has sent login request to connect to the Web chat server, and redirects the login request to the Web chat server.

In one embodiment, the user equipment that connects to the Web chat server sends a message fetching command from time to time (or periodically) and to acquire instant messages sent out from the opposite user equipment through Web chat server. To optimize the efficiency, the system may increase the frequency of instant message fetching after the browser user receives an instant message from Web chat server or the browser user sends an instant message to the Web chat server. Conversely, if the browser user does not receive any instant message from the Web chat server within a preset time interval, the system may decrease the frequency of instant message fetching.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other features and benefits of the disclosed method and system will become more readily understandable from the following detailed description and figures.

BRIEF DESCRIPTION OF THE FIGURES

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION OF THE INVENTION

In this description, the following terms are used in their broadest meaning and should be interpreted accordingly as explained below.

An instant messaging user (source user and target user) may be an individual person, a group of people, or a representative of such, that participates in information exchange in instant messaging.

A user terminal for instant messaging is an electronic or electromechanical hardware device that is used for entering data into, and displaying data from, a computer or a computing system. A user terminal for instant messaging typically has a text terminal interface over a communication line (either wired or wireless), but other types of interfaces such as audio and video may be used either in place of or in addition to the text interface. The user terminal may be connected to or constitute a part of a computing device such as a personal computer (PC), a fixed computer terminal at a public place, a mobile computer, a personal digital assistant (PDA) or a mobile cellular phone.

A browser or Web browser is a software application that enables a user to display and interact with text, images, and other information typically located on a web page at a website on the World Wide Web or a local area network.

A dispatch server uses client IP address to help decide which servers to assign to the client. The dispatch server allows the system to control access, to provide redundancy in case a server is down, and to perform load balancing.

The disclosed instant messaging system and method use a user server (such as a Web chat server) of a browser user to transmit instant messages between instant messaging users. An instant messaging user may be a browser user or an instant messaging client software user. The system and method allow instant messaging between a browser user and an instant messaging client software user, as well as instant messaging between two browser users, without installation of instant messaging software.

The use of a browser to implement instant messaging eliminates the requirement of specific instant messaging software for instant messaging in the existing technologies.

Figure 1:
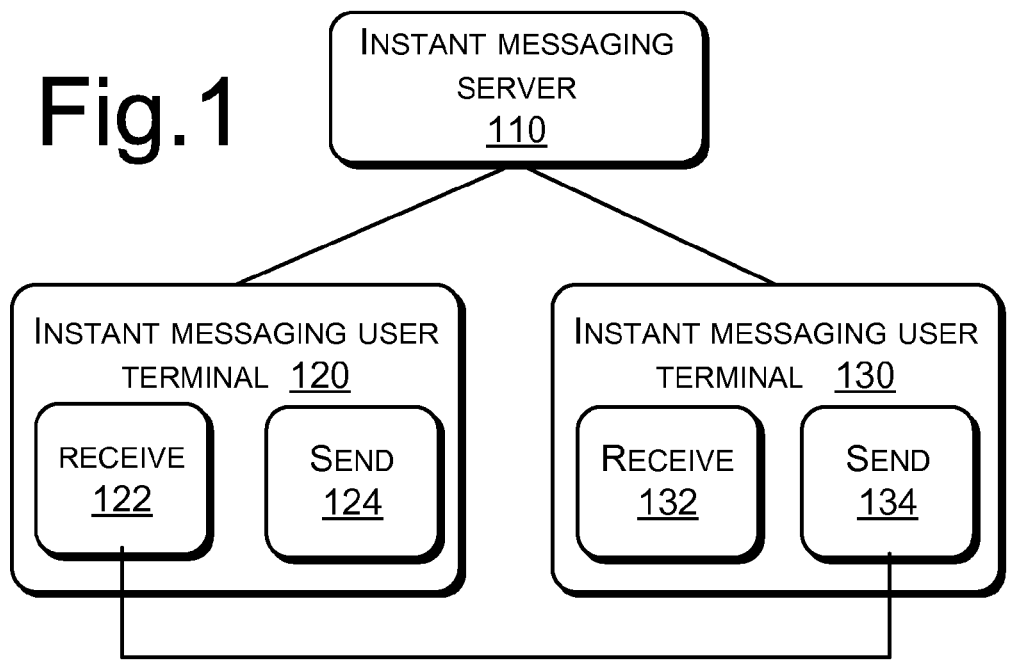
FIG. 1 shows a common instant messaging system.
Figure 2:
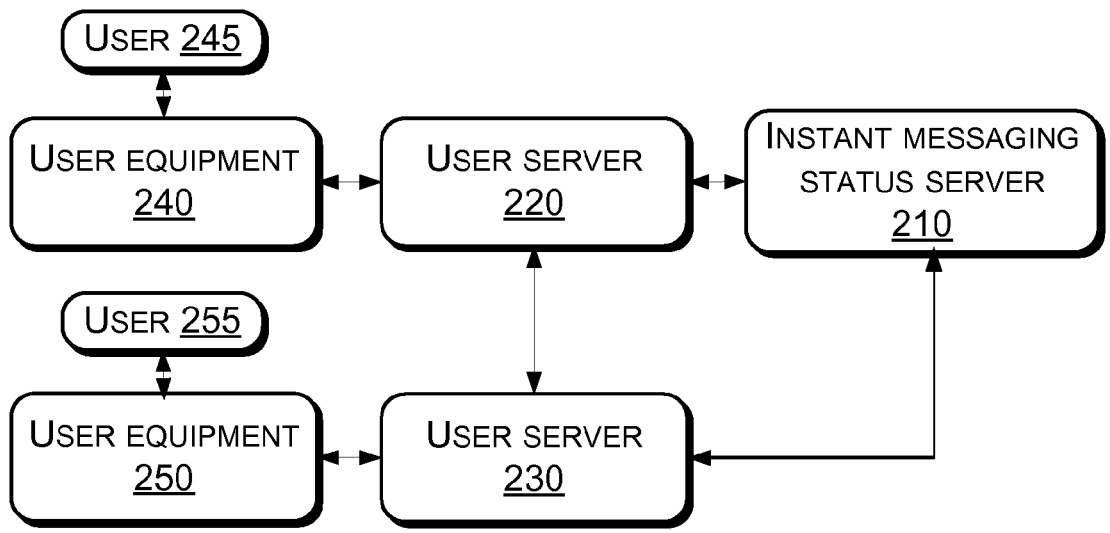
FIG. 2 is a schematic block representation of an exemplary instant messaging system using a browser in accordance with the present disclosure.

FIG. 2 is a schematic block representation of an exemplary instant messaging system using a browser in accordance with the present disclosure. The system includes instant messaging status server 210, and user servers 220 and 230 which connect to instant messaging status server 210. User server 220 connects to user equipment 240, and likewise user server 230 connects to user equipment 250. The user equipment 240 and 250 may be any suitable computing device as a user terminal for instant messaging. Instant messaging users 245 and 255 communicate with each other via respective user equipment 240 and 250.

Instant messaging status server 210 is used to record the information of the user server (e.g., 220 or 230) which a user logs in and user status information (e.g., a user status message) of the user. User servers 220 and 230 are used to control the network access of the users (e.g., 245 and 255) and transmit instant messages between the users. Each user server 220 and 230 can connect with multiple sets of user equipment to support multiple users (only one user and one set of using equipment are shown for each user server 220 and 230). User servers 220 and 230 can acquire from instant messaging status server 210 information of another user server which another user logs into and the status of that user.

In one embodiment, at least one of the user servers 220 and 230 is a Web chat server which connects to a browser user. In another embodiment, at least one of the user servers 220 and 230 is an instant messaging server which connects with an instant messaging client software user.

Figure 3:
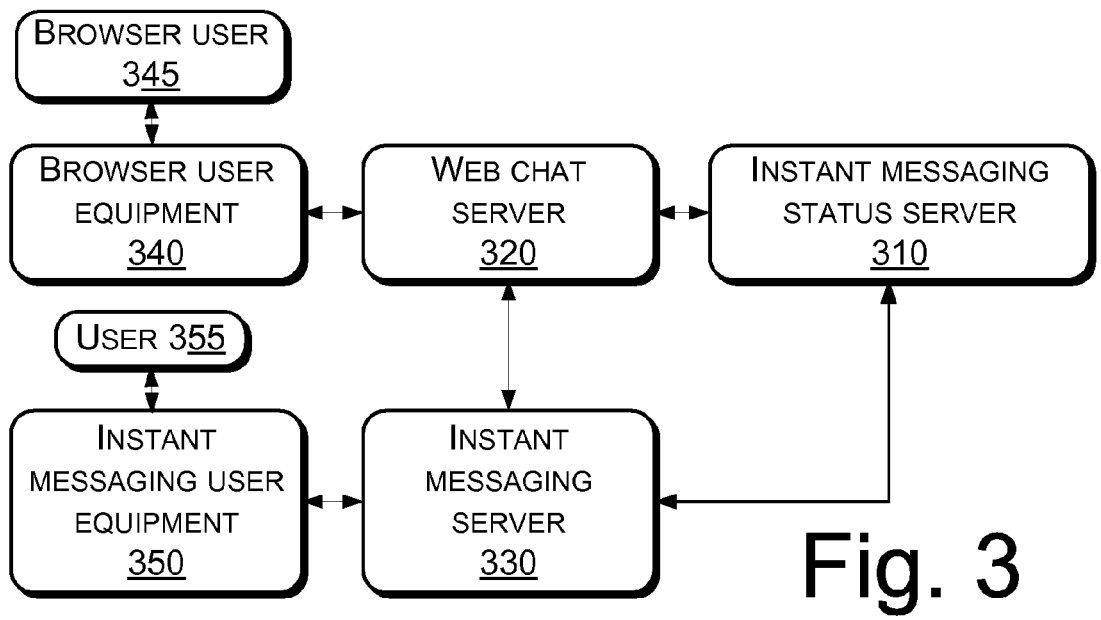
FIG. 3 is a schematic block representation of an exemplary instant messaging between a browser user and an instant messaging user.

FIG. 3 is a schematic block representation of an exemplary instant messaging between a browser user and an instant messaging user. The system includes instant messaging status server 310, and Web chat server 320 and instant message and instant messaging server 330 both connected to instant messaging status server 310. Any other user servers besides Web chat server 320 and instant messaging server 330 are omitted in FIG. 3. Web chat server 320 connects to browser user equipment 340 operated by browser user 345, and likewise instant messaging server 330 connects to instant messaging user equipment 350 operated by user 355. The user 355 may be a conventional instant messaging user performing instant messaging using client software installed on instant messaging user equipment 350.

The browser user equipment 340 and instant messaging user equipment 350 may be any suitable computing device as a user terminal for instant messaging. Typically, the browser using equipment 340 may include a computing device that runs a Web browser.

When browser user 345 initiates the instant messaging by sending an instant message to user 355, Web chat server 320 first inquires the information of the instant messaging server 330 through instant messaging status server 310 and then sends the instant messaging to the instant messaging server 330. Instant messaging server 330 then transmits the instant message to user 355. If the user 355 replies via instant messaging using equipment 350, instant messaging server 330 sends the reply message of the user 355 to the Web chat server 320 which transmits the message to the browser user 345.

When user 355 initiates to send an instant message to browser user 345, instant messaging server 330 first finds the information of the Web chat server 320 through instant messaging status server 310 and then sends the instant message to Web chat server 320. The Web chat server 320 then transmits the instant message to the browser user 345. If the browser user 345 replies, Web chat server 320 sends the reply message of the browser user 345 back to the instant messaging server 330 which transmits it to user 355.

Before instant messaging, browser user 345 may need to log into a user server 320. In order to do this, a user server is assigned by a dispatch server (not shown) to browser user 345 to establish a connection between browser user 345 and Web chat server 320 for user login. The dispatched user server may either be a separate user server (not shown) or Web chat server 320 itself.

There are two kinds of logins—anonymous login and non-anonymous login. The type of login represents the manner browser user 345 communicates with the target user 355. For instance, browser user 345 may use anonymous login to establish anonymous instant messaging with user 355, or use non-anonymous login to establish explicitly named instant messaging with user 355.

In anonymous login scenario, the browser user 345 anonymously clicks on an online icon of the target user 355. The dispatch server (not shown) then assigns the browser user 345 to Web chat server 320 where the browser user 345 logs into.

Non-anonymous login includes manual login and automatic login, where manual login refers to a situation in which browser user 345 enters user name and password to log in, while the Web chat server 320 assigned to browser user 345 validates browser user 345 and allows browser user 345 to log into Web chat server 320 after successful validation.

Automatic login refers to a situation in which browser user 345 has already logged into a web site (not shown) and the Web chat server 320 is deployed with this web site and has established mutual trust. In this case, there may be no need for the browser user 345 to re-enter user name and password as Web chat server 320 can validate the information of the corresponding web site's cookie carried by browser user 345. Once successfully validated, browser user 345 automatically logs into the Web chat server 320.

After the dispatch server (not shown) assigns the browser user 345 to Web chat server 320, any communication between browser user 345 and other servers is preferably maintained through Web chat server 320 for an entire instant messaging session. This avoids the browser user 345 from logging into a different server which does not have any related information about browser user 345, thus preventing unnecessary server workload and repetitive login. An instant message session may last as long as the browser user 345 remains logged in, or maybe defined as a certain activity period in which a prescribed level of instant messaging activities are performed.

One way to accomplish the above is to maintain a TCP (Transmission Control Protocol)-like virtual link between the browser using equipment 340 and Web chat server 320. Since the conventional communication between a browser and a server is usually through HTTP (Hypertext Transfer Protocol) which is a short-term link, the server may commonly disconnect the TCP link with the browser after a certain period of time. In this case, the assigned user server (e.g., Web chat server 320) may re-establish the TCP connection when the browser communicates with the server again. In any event, it is preferable to maintain non-switched communication link between the browser using equipment 340 and Web chat server 320.

Figure 4:
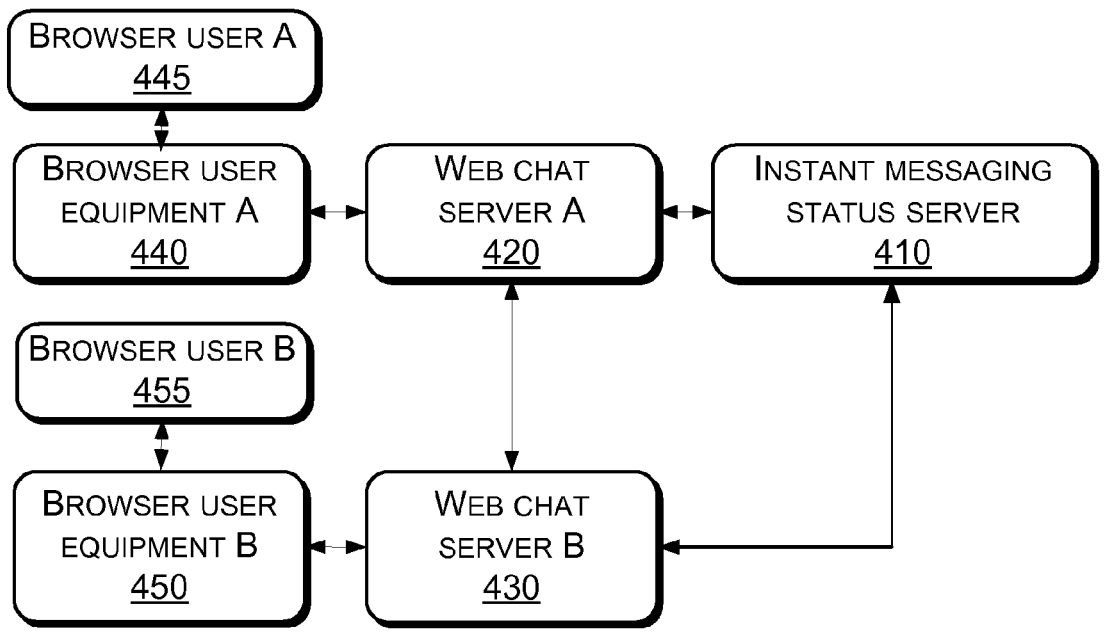
FIG. 4 is a schematic block representation of an exemplary instant messaging between two browser users.

FIG. 4 is a schematic block representation of an exemplary instant messaging between two browser users. The system includes instant messaging status server 410, and Web chat servers 420 and 430 both connected to instant messaging status server 410. Web chat server A 420 connects to browser user equipment A 440 operated by browser user A 445, and likewise Web chat server B 430 connects to browser user equipment B 450 operated by browser user B 455. The browser user equipment A 440 and browser user equipment B 450 may be any suitable computing device as a user terminal for instant messaging.

When browser user A 445 sends an instant message to browser user B 455, Web chat server A 420 first inquires the information of the Web chat server B 430 through instant messaging status server 410 and then sends the instant message to the Web chat server B 430. Web chat server B 430 subsequently forwards the instant message to browser user B 455 and sends a reply instant message of browser user B 455 to the Web chat server A 420 which then transmits the message to browser user A 445. Instant messaging from browser user B 455 to browser user 445 follows the same procedures but in an opposite direction.

It is appreciated that the system and method described herein are not restricted to direct transmission of instant messages between the user servers of the browser user and the user server of the opposite user. Instead, indirect transmission of the messages through other servers may be applied. For example, if the two user servers (e.g., 220 and 230, 320 and 330 or 420 and 430) are not in the same local area network (LAN), they may not be able to directly communicate with each other but may need to go through a gateway server and other service for communication.

The logon process of browser user A 445 and browser user B 455 is similar to that of browser user 345 described in FIG. 3. Further detail of the logon process is described below.

Figure 5:
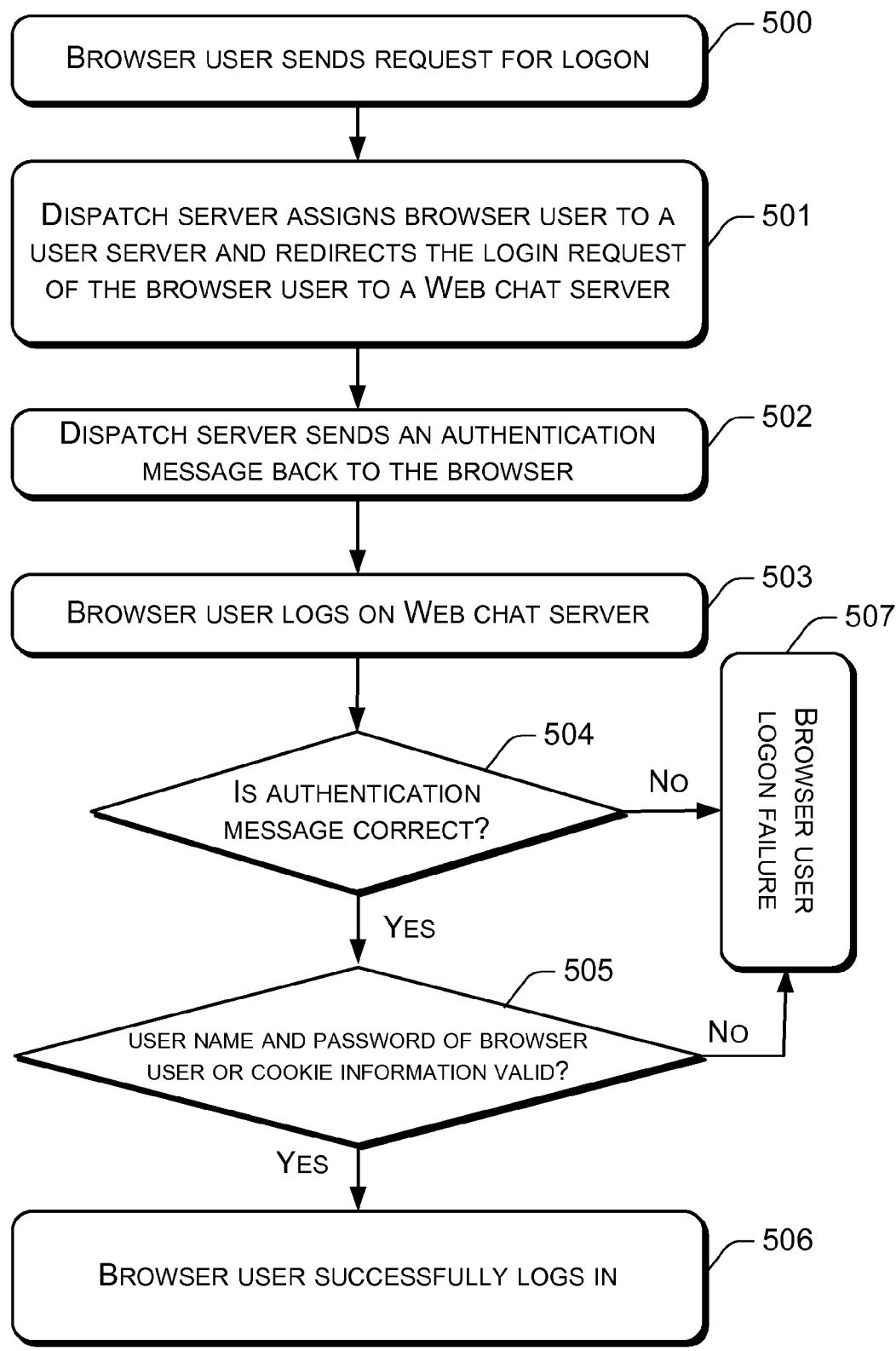
FIG. 5 is a flow chart of an exemplary process showing how a browser user logs onto the Web chat server to conduct instant messaging.

FIG. 5 is a flow chart of an exemplary process showing how a browser user logs onto the Web chat server to conduct instant messaging. The process is described in blocks. The process is described with reference to browser user 345 in FIG. 3, but is also applicable to browser users 445 and 455.

In FIG. 5, and other figures herein illustrating a process, the order in which the method is described is not intended to be construed as a limitation, and any number of the described method blocks may be combined in any order to implement the method, or an alternate method.

At block 500, browser user 345 sends login request to the dispatch server (not shown) from a web page. Alternatively, browser user 345 may use a standard HTTP command to send the login request. An example of such logon request is the GET command in http://dns.webchat.alibaba.com/login_requst.

At block 501, the dispatch server assigns browser user 345 to a user server (e.g., Web chat server 320) and redirects the login request of browser user 345 to the Web chat server 320. The dispatch server can use a number of strategies to determine this assignment. For instance, assignment can be based on the number of current users logged in the Web chat servers, among which servers the one with the fewest number of users is chosen for the requesting browser user 345. Alternatively, Web chat server can be chosen according to cyclic allocation, while redirection of login request to Web chat server 320 can be achieved either through 3xx command (redirection command in the definition of RFC 2616 found in standard HTTP protocol) or by command in META-HTTP-EQUIV="Refresh" CONTENT="0;URL=http://dest_host_dns_name".

At block 502, the dispatch server then sends an authentication message back to the browser user 345. The authentication message is a message including a series of non-repetitive character strings and is used when the Web chat server 320 validates whether the login request is transferred from dispatch server.

At block 503, browser user 345 logs on Web chat server 320.

At block 504, Web chat server 320 validates whether the authentication message sent from the dispatch server to the browser user 345 is correct. If it is correct, the process continues to block 505. Otherwise, the process goes to block 507 to indicate a browser user logon failure.

At block 505, Web chat server 320 validates the user name and password of the browser user 345 or cookie information carried by the logon message of the browser user 345. If validation is successful, the process continues to block 506. Otherwise, the process goes to block 507.

At block 506, browser user 345 has successfully logged in.

At block 507, the process indicates that browser user 345 has failed to log in. A reason of login failure may be provided to the browser user 345.

In the process of anonymous login by browser user 345, the block 505 is skipped to go to the block 506 directly.

After browser user 345 successfully logs into Web chat server 320, browser user 345 can have instant messaging with another user, such as a conventional instant messaging user 355 using client software or another browser user (e.g., 455). For instant messaging with an instant messaging client software user 355, either browser user 345 or user 355 can initiate instant messaging by sending an instant messaging request. In the process of instant messaging, instant messaging server 320 can directly transmit the instant message to instant messaging client software user 355.

Where the target user is also a browser user, such as that shown in the configuration of FIG. 4, the Web chat server (e.g., 420) may not be able to directly transmit the instant message to the target browser user 455. If this is the case, the target browser user 455 may need to proactively go to the Web chat server 420 to fetch any instant message sent by the other parties such as browser user 445.

The browser and the browser user equipment (340, 440, or 450) may use any suitable method to send an instant message or to send a command for fetching instant messages. One exemplary method is to use Ajax (asynchronous XMLHTTP) to communicate with the respective Web chat server (320, 420 or 430).

If the Web chat server (320, 420 or 430) does not send instant messages directly to a target user server (e.g., 330, 430, or 420), it may first put the messages in a cache memory and wait for the intended target user (e.g., browser user 455) to acquire it. The Web chat server may do the same with regard to all the information such as status change message received from instant messaging status server (310 or 410).

In one embodiment, the browser user sends message fetching commands to the respective Web chat server periodically or in time intervals. The time interval can be set either by the Web chat server or the browser user. The initial time interval between two consecutive instant message fetching commands may either be preset or set by at least one of the source server and the target server. If the initial time interval is set by a Web chat server, it may be set after the browser user has successfully logged into the Web chat server. Alternatively, the initial time interval may be set locally by a user such as the browser user.

When the browser user acquires the instant message from an opposite user or sends out an instant message to the opposite user, the browser user enters into a time phase which can be referred to as a "chatting" mode. Within the chatting mode, the frequency the browser user fetches messages from the respective Web chat server may change in order to improve efficiency.

For instance, referring to FIG. 4, assume the time interval is locally set by the browser user end (e.g., either manually by browser user A 445 or automatically by browser using equipment A 440). After an occurrence of browser user 445 acquiring an instant message from, or an occurrence of browser user 445 sending an instant message to Web chat server 420, the frequency of fetching instant message may be increased to accommodate unanticipated "chatting" mode with a high activity time period. If browser user 445 does not acquire any instant message from Web chat server 420 after sending a fetching command, the frequency of instant message fetching may be decreased to reflect an anticipated low activity time period.

For example, assume browser user 445 sets the time interval at thirty seconds initially. In other words, browser user 445 sends a message fetching command to Web chat server every thirty seconds. The frequency changes based on whether instant message is acquired or sent. If the browser user 445 acquires an instant message, the time interval may change from thirty seconds to two seconds, for instance. If later on there is no message acquired by the browser user 445, the time interval may be increased from two seconds to four seconds. If there is still no instant message in the next fetch (or several fetches), the time interval is raised to six seconds, then eighteen seconds, and finally back to thirty seconds. If browser user 445 subsequently acquires an instant message from or sends an instant message to Web chat server 420, the system again enters into a "chatting" mode and time interval changes accordingly.

If a preset time interval (e.g., ten fetching intervals which is 10×30 sec=6 minutes) has passed and the browser user 445 has not acquired any instant message, that browser user may be considered to have been logged off and Web chat server will delete the memory in the cache used for that browser user and inform the opposite user that the browser user has logged off.

Figure 6:
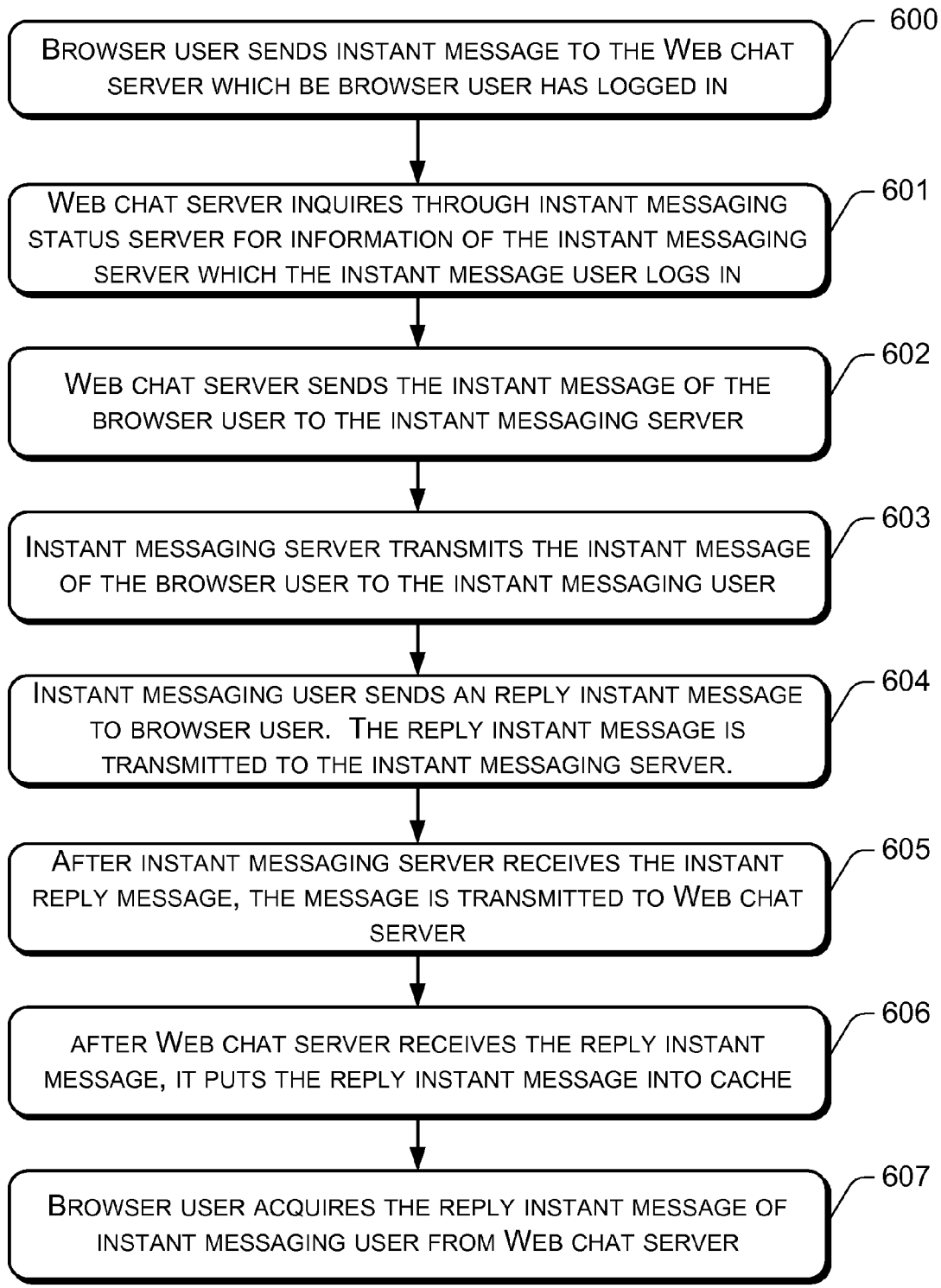
FIG. 6 is a flowchart of an exemplary process showing how a browser user initiates sending instant message to an instant messaging user and how the instant messages is communicated between them.

FIG. 6 is a flowchart of an exemplary process showing how a browser user initiates sending instant message to an instant messaging user and how the instant messages is communicated between them. The process in FIG. 6 is described with reference to FIG. 3, but may be applicable to other configurations as well.

At block 600, browser user 345 sends an instant message to the Web chat server 320 which the browser user 345 has logged in.

At block 601, Web chat server 320 inquires through instant messaging status server 310 the information of the instant messaging server 330, which the instant message user 355 logs in.

At block 602, Web chat server 320 sends the instant message of the browser user 345 to the instant messaging server 330.

At block 603, the instant messaging server 330 transmits the instant message to the instant messaging user 355.

At block 604, the instant messaging user 355 sends a reply instant message to the browser user 345. The reply instant message is sent to instant messaging server 330.

At block 605, after instant messaging server 330 receives the reply instant message from the instant messaging user 355, the reply instant message is transmitted to Web chat server 320.

At block 606, after Web chat server 320 has received the reply instant message, it puts the reply instant message into cache.

At block 607, the browser user 345 acquires the reply instant message from Web chat server 320.

Figure 7:
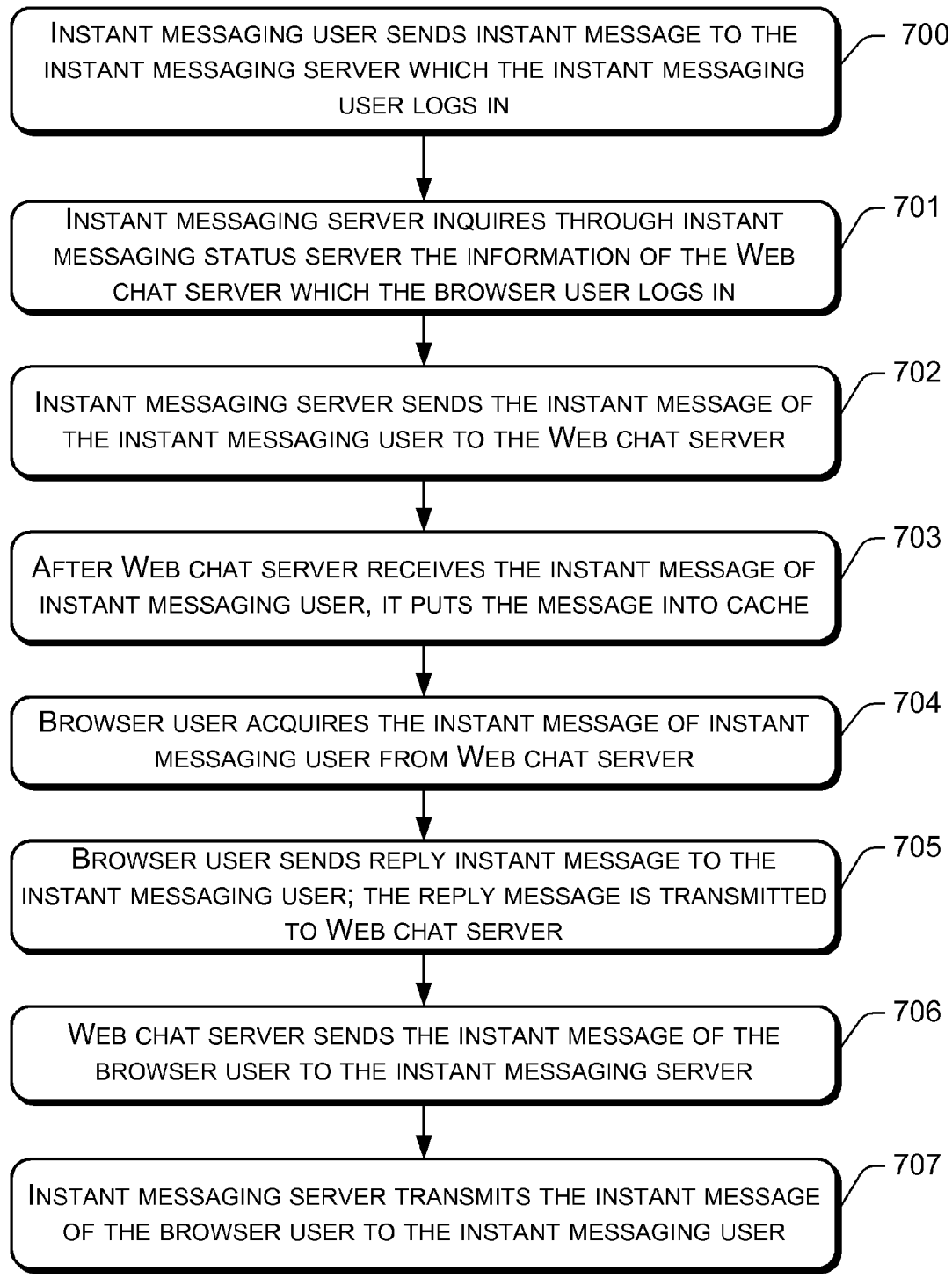
FIG. 7 is a flowchart of an exemplary process showing how an instant messaging user initiates an instant message to a browser user and how the instant message is communicated between them.

FIG. 7 is a flowchart of an exemplary process showing how an instant messaging user initiates an instant message to a browser user and how the instant message is communicated between them. The process in FIG. 7 is described with reference to FIG. 3, but may be applicable to other configurations as well.

At block 700, instant messaging user 355 sends an instant message to the instant messaging server 330 which he has logged in.

At block 701, the instant messaging server 330 inquires through instant messaging status server 310 the information of the Web chat server 320, which the browser user 345 has logged in.

At block 702, the instant messaging server 330 sends the instant message of the instant messaging user 355 to the Web chat server 320.

At block 703, after Web chat server 320 has received the instant message of instant messaging user 355, it puts the message into cache.

At block 704, the browser user 345 acquires the instant message of instant messaging user 355 from Web chat server 320.

At block 705, the browser user 345 sends a reply instant message to the instant messaging user 355. This message is transmitted to the Web chat server 320 which the browser user 345 has logged in.

At block 706, the Web chat server 320 sends the instant message of the browser user 345 to the instant messaging server 330.

At block 707, the instant messaging server 330 transmits the instant message of the browser user 345 to the instant messaging user 355.

Figure 8:
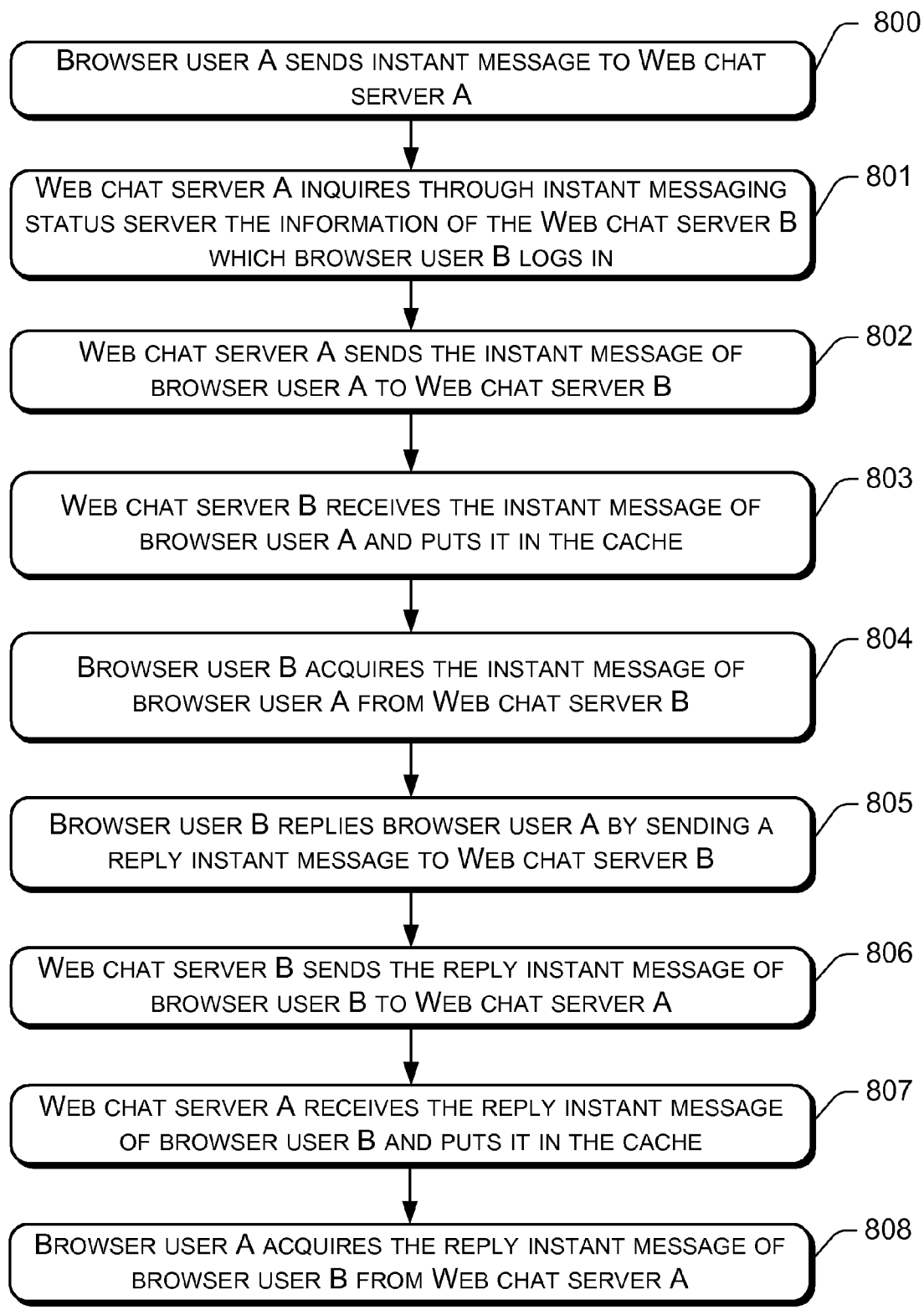
FIG. 8 is a flowchart of an exemplary process showing how two browser users send instant messages to each other.

FIG. 8 is a flowchart of an exemplary process showing how two browser users send instant messages with each other. The process of FIG. 8 is described with reference to FIG. 4, but may also be applicable to other configurations.

At block 800, browser user A 445 sends an instant message to Web chat server A 420.

At block 801, Web chat server A 420 inquires through instant messaging status server 410 the information of the server (Web chat server B 430) which browser user B logs in.

At block 802, Web chat server A 420 sends the instant message of browser user A 445 to Web chat server B 430.

At block 803, Web chat server B 430 receives the instant message of browser user A 445 and puts it in the cache.

At block 804, browser user B 455 acquires the instant message of browser user A 445 from Web chat server B 430.

At block 805, browser user B 455 replies browser user A 445 by sending a reply instant message to Web chat server B 430.

At block 806, Web chat server B 430 sends the instant message of browser user B 455 to Web chat server A 420.

At block 807, Web chat server A 420 receives the instant message of browser user B 455 and puts it in the cache.

At block 808, browser user A 445 acquires the reply instant message of browser user B 455 from Web chat server A 420.

The same process as above is engaged when browser user B 455 initiates to send an instant message to browser user A 445, except that the process takes an opposite direction with an exchange between "A" and "B".

During an instant messaging process, the status of a user may change from online to off-line. For example, a user in the midst of instant messaging may become offline because of a network break-off, computer shutdown or browser shutdown. The instant messaging system should preferably be adapted to communicate such status change of a user to its opposite party.

Figure 9:
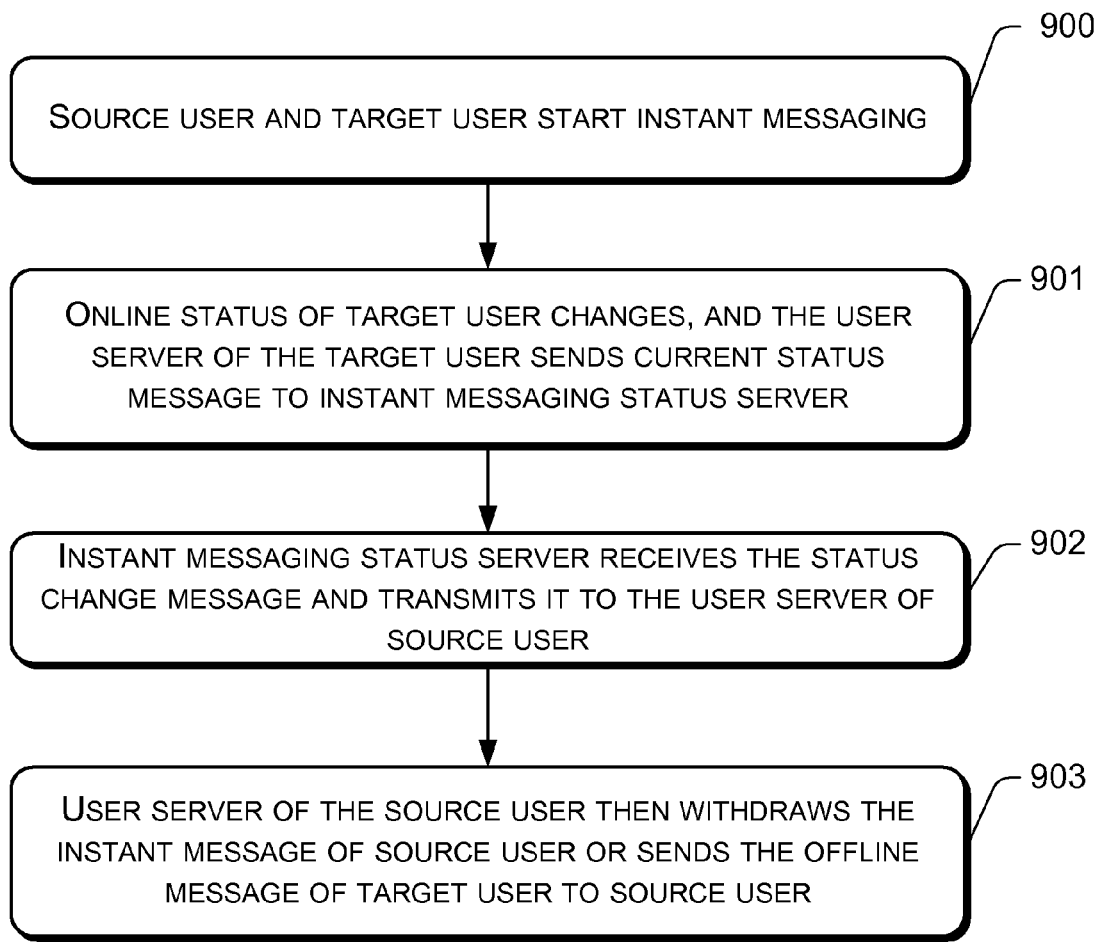
FIG. 9 is a flowchart of an exemplary instant messaging process in which the status of the user changes.

FIG. 9 is a flowchart of an exemplary instant messaging process in which the status of the user changes. The process of FIG. 9 is described with reference to FIG. 4, but may also be applicable to other configurations. The description below assumes that browser user A 445 is a source user who sends out a message, and browser user B 455 is a target user who receives the message from the source user. The same description applies if browser user A 445 and browser user B 455 exchange roles.

At block 900, the source user (browser user A 445) and the target user (browser user B 455) start instant messaging.

At block 901, the online status of the target user (browser user B 455) changes. The target user server (Web chat server B 430) sends the current (new) status message to the instant messaging status server 410.

At block 902, the instant messaging status server receives this status change message and transmits it to the source user server (Web chat server A 420).

At block 903, the source user server (Web chat server A 420) then withdraws the instant message of source user 445. Alternatively or additionally, the source user server (Web chat server A 420) may send the offline message of target user (browser user B 455) to source user (browser user A 445).

By the same token, if the status of the source user (browser user A 445) changes, the source user server (Web chat server A 420) sends the current status message to the instant messaging status server which transmits the status message to the target user server (Web chat server B 430). The target user server then withdraws the reply instant message (if there is one) of the target user or sends the offline message of the source user to the target user.

The techniques and processes described above may be implemented in a variety of environments. In particular, the above-described techniques and processes may be implemented with the help of a computing device, such as a personal computer (PC).

Figure 10:
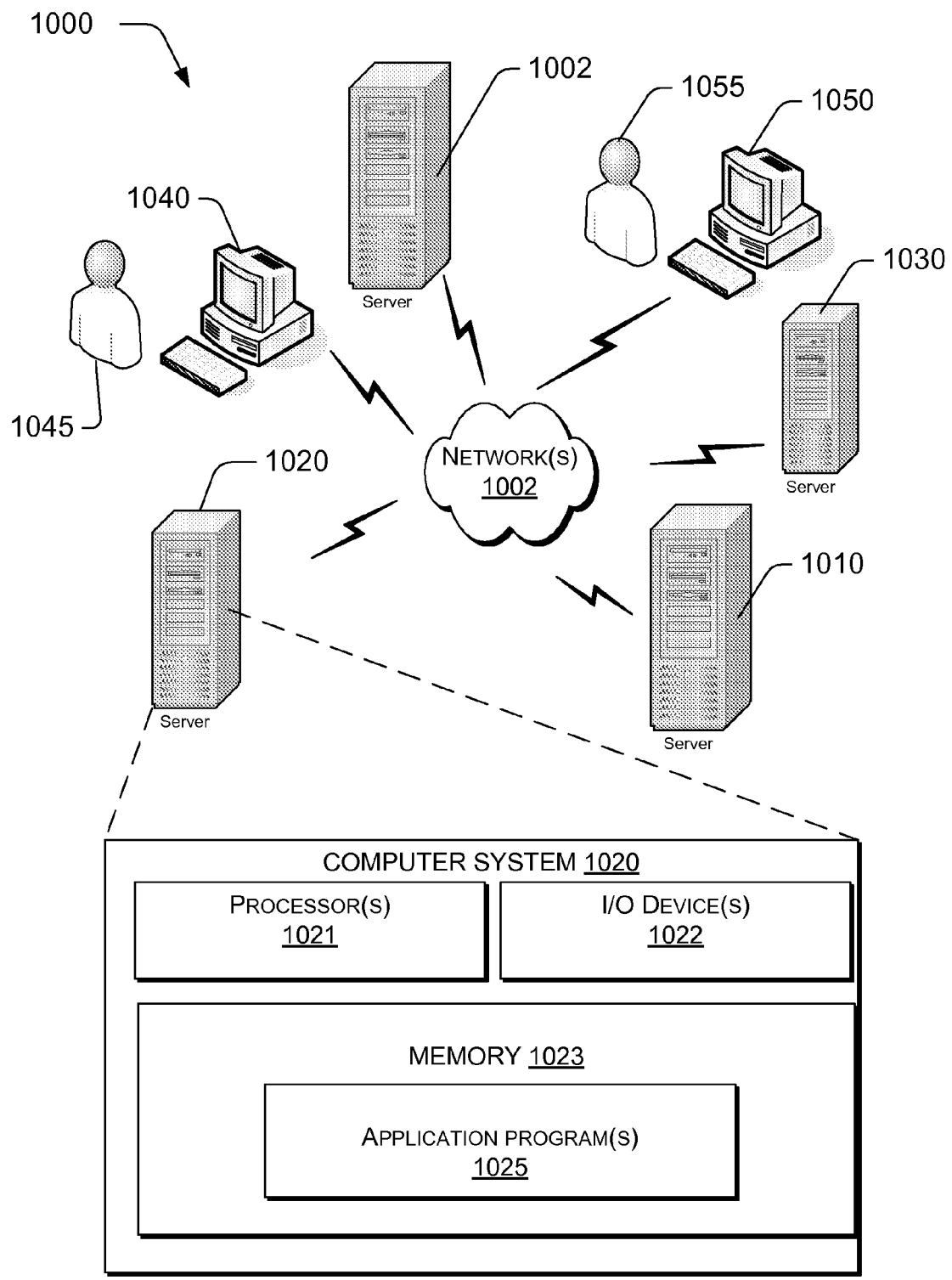
FIG. 10 shows an exemplary environment for implementing the instant messaging system in accordance with the present disclosure.

FIG. 10 shows an exemplary environment for implementing the instant messaging system. The system 1000 is a computer and server-based implementation of the systems shown in FIGS. 2-4. The system 1000 include dispatch server 1002, instant messaging status server 1010, user servers 1020 and 1030, and user computers 1040 and 1050 operated by instant messaging users 1045 and 1055, respectively, all connected through network(s) 1002. In operation, when user 1045 requests to log in, the dispatch server 1002 assigns user server 1020 to user 1045. When user 1055 requests to log in, the dispatch server 1002 assigns user server 1030 to user 1045. These assignments may be dynamic, meaning that the user may be assigned to a different user server each time when the user signs on. Alternatively, at least some of the users may be connected to a fixed server.

At least part of the processes described herein may be implemented in the servers including user servers 1020 and 1030. As shown in FIG. 10, user server 1020 includes processor(s) 1021, I/O devices 1022, and memory 1023. The memory 1023 may be any suitable computer-readable media. Other servers such as user server 1030, dispatch server 1002 and instant messaging status server 1010 may have similar configurations. User computers 1040 and 1050 may also have similar computing configurations but usually also have a display for user interface.

Application programs 1025 are implemented with the user server 1020 and stored in memory 1023. Similar application programs may also be implemented with the other servers such as user server 1030, dispatch server 1002 and instant messaging status server 1010. Some parts of application programs, such as instant messaging client software and browser, may also be implemented with the user computers 1040 and 1050. In one preferable embodiment, however, at least one of the user computers 1040 and 1050 requires no instant messaging client software to be installed thereon.

Application programs 1025 and other programs implemented on the other servers contain instructions which, when executed by a computer processors, cause the processors to perform actions of a process described herein (e.g., the processes of FIGS. 5-9) for instant messaging.

It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-ex-complete instructions may either be delivered in a tangible physical memory device or transmitted electronically.

It is also appreciated that a computing device may be any device that has a processor, an I/O device and a memory (either an internal memory or an external memory), and is not limited to a PC. For example, a computer device may be, without limitation, a set top box, a TV having a computing unit, a display having a computing unit, a printer or a digital camera.

This disclosure is based on the communication between a browser and a user server, eliminating the need of download and installation of instant messaging software at the user end. The user can use a web page to chat with other users and observe the other user's online status, thus avoiding situations in which the firewall disallows online chat. Moreover, whenever the server updates the version of the software, the users will be using the latest software version, hence saving the burden of updating by the user. Using a browser, a browser user can achieve instant messaging with an instant messaging user or with another browser user.

The above description, including the specification and drawings, is illustrative and not restrictive. Many variations of the invention will become apparent to those of skill in the art upon review of this disclosure. Various features and aspects of the above-described disclosure may be used individually or jointly. Further, the present disclosure can be utilized in any number of environments and applications beyond those described herein without departing from the broader spirit and scope of the specification. The scope of the invention should, therefore, be determined not with reference to the above description, but instead should be determined with reference to the appended claims along with their full scope of equivalents.

What is claimed is:

1. A method of instant messaging using a browser, the method comprising:
   receiving at a source server an instant message sent from a source user to a target user, at least one of the source user or the target user being a browser user using a browser to perform instant messaging;
   inquiring by the source server through a status server for information of a target server which the target user logs in;
   sending the instant message to the target server;
   transmitting by the target server the instant message to the target user;
   receiving periodically by one of the source server or the target server an instant message fetching command from the browser user at a variable frequency, the variable frequency increasing from a first frequency to a second frequency in response to the source user or the target user acquiring an instant message from or sending an instant message to the other of the source user and target user, the variable frequency decreasing to one or more interim frequencies before decreasing to the first frequency when the browser user acquires no instant message in response to subsequent instant message fetching commands; and
   deleting a memory in a cache used for the browser user in response to the browser user not receiving any instant message for a predetermined period of time.

2. The method as recited in claim 1, further comprising:
   sending a reply instant message by the target server to the source server; and
   transmitting the reply instant message by the source server to the source user.

3. The method as recited in claim 1, wherein the source user uses a browser to perform instant messaging, and the source server comprises a Web chat server.

4. The method as recited in claim 1, wherein the source user uses a browser to perform instant messaging, the method further comprising:
   receiving by a dispatch server from the source user a logon information before the source user performs instant messaging; and
   redirecting by the dispatch server the source user to a Web chat server which serves as the source server.

5. The method as recited in claim 1, wherein the source user uses a browser to perform instant messaging, the method further comprising:
   receiving by a dispatch server from the source user a logon information before the source user performs instant messaging;
   redirecting by the dispatch server the source user to a Web chat server which serves as the source server; and
   authenticating by the Web chat server the logon information received from the source user.

6. The method as recited in claim 1, wherein the target user uses a browser to perform instant messaging, and the target server comprises a Web chat server.

7. The method as recited in claim 1, wherein the target user uses a browser to perform instant messaging, the method further comprising:
   receiving by a dispatch server from the target user a logon information before the target user performs instant messaging; and
   redirecting by the dispatch server the target user to a Web chat server which serves as the target server.

8. The method as recited in claim 1, wherein the target user uses a browser to perform instant messaging, the method further comprising:
receiving by a dispatch server from the target user a logon information before the target user performs instant messaging;
redirecting by the dispatch server the target user to a Web chat server which serves as the target server;
authenticating by the Web chat server the logon information received from the target user.

9. The method as recited in claim 1, further comprising:
receiving by a dispatch server from the browser user a logon request containing logon information;
assigning by the dispatch server a Web chat server to the browser user according to the logon information in the login request; and
redirecting by the dispatch server the logon request to the Web chat server.

10. The method as recited in claim 1, further comprising:
allowing the browser user to logon to a Web chat server; and
maintaining a communication connection for instant messaging between the browser user and the Web chat server during an entire session of instant messaging.

11. The method as recited in claim 1, wherein the instant message fetching command is received by the source server or the target server at a variable frequency which is increased if the fetching command acquires an instant message.

12. The method as recited in claim 1, wherein the instant message fetching command is received by the source server or the target server at a variable frequency which is increased when at least one of the source user and the target user sends an instant message.

13. The method as recited in claim 1, wherein the instant message fetching command is received by the source server or the target server at a variable frequency which is decreased if the fetching command does not acquire any instant message within a preset time interval.

14. The method as recited in claim 1, further comprising:
sending from one of the source server and the target server to the status server a current status message when logon status of the respective source user or the target user changes; and
sending from the status server the current status message to the other of the source server and the target server.

15. An instant messaging system, comprising:
a processor-based instant messaging status server;
a processor-based source user server that is communicatively coupled to a source user; and
a processor-based target user server that is communicatively coupled to a target user, wherein:
at least one of the source user server or the target user server is a Web chat server accepting logon by a browser user from a browser to send or receive an instant message;
the instant messaging status server records information of the source user server and the target user server and user logon status information;
at least one of the source server or the target server receives periodically an instant message fetching command from the source user or the target user, respectively, at a variable frequency, the variable frequency increasing from a first frequency to a second frequency in response to the source user or the target user acquiring an instant message from or sending an instant message to the other of the source user and the target user, the variable frequency staying at the second frequency unless the browser user acquires no instant message in response to subsequent instant message fetching commands at which time the variable frequency decreases progressively towards the first frequency, and deletes a memory in a cache used for the browser user in response to the browser user not receiving any instant message for a predetermined period of time.

16. The instant messaging system as recited in claim 15, wherein the instant messaging status server, the source user server and the target user server are connected through a network.

17. The instant messaging system as recited in claim 15, wherein the source user server is adapted to receive from the instant messaging status server a logon status information of a target user logged on to the target user server.

18. The instant messaging system as recited in claim 15, wherein the Web chat server is adapted to receive from a user logged on the Web chat server a periodical command for fetching instant messages.

19. One or more memory devices having stored thereupon instructions that, when executed by a processor, cause the processor to perform actions comprising:
receiving at a source server an instant message sent from a source user to a target user, at least one of the source user and the target user using a browser to perform instant messaging;
inquiring by the source server through a status server for information of a target server which the target user logs in;
sending the instant message to the target server;
transmitting by the target server the instant message to target user;
receiving periodically by one of the source server or the target server an instant message fetching command from the browser user at a variable frequency, the variable frequency increasing from a first frequency to a second frequency in response to the source user or the target user acquiring an instant message from or sending an instant message to the other of the source user and the target user, the variable frequency staying at the second frequency unless the browser user acquires no instant message in response to subsequent instant message fetching commands at which time the variable frequency decreases progressively towards the first frequency; and
deleting a memory in a cache used for the browser user in response to the browser user not receiving any instant message for a predetermined period of time.

* * * * *